R. G. INWOOD, DEC'D.
M. C. INWOOD, ADMINISTRATRIX.
MACHINE FOR USE IN MAKING BOX PARTS OR BOXES.
APPLICATION FILED JUNE 25, 1917.

1,332,728.

Patented Mar. 2, 1920.
6 SHEETS—SHEET 1.

Inventor:
Richard G. Inwood,
by Emery, Booth, Janney & Varney
Attys

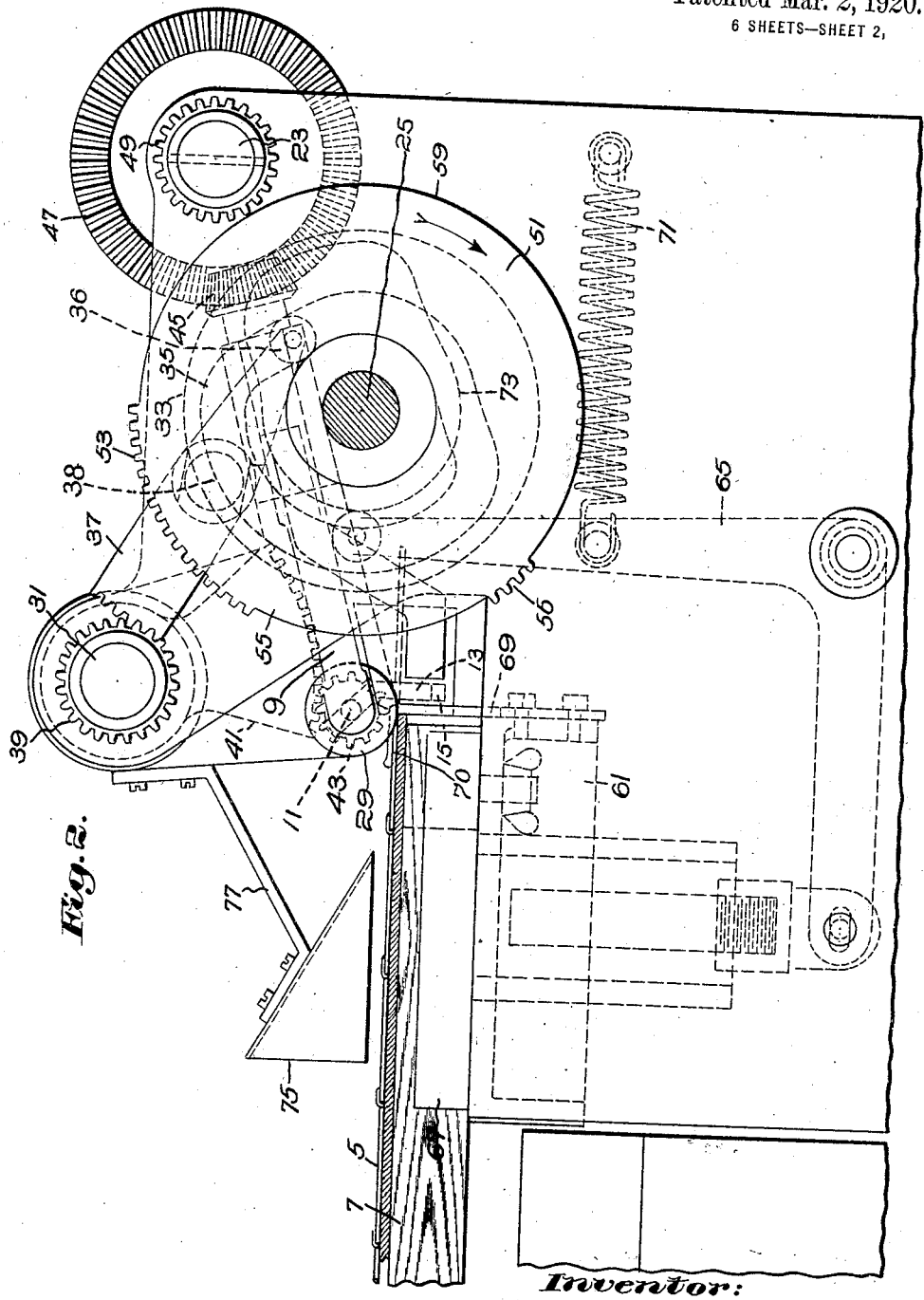

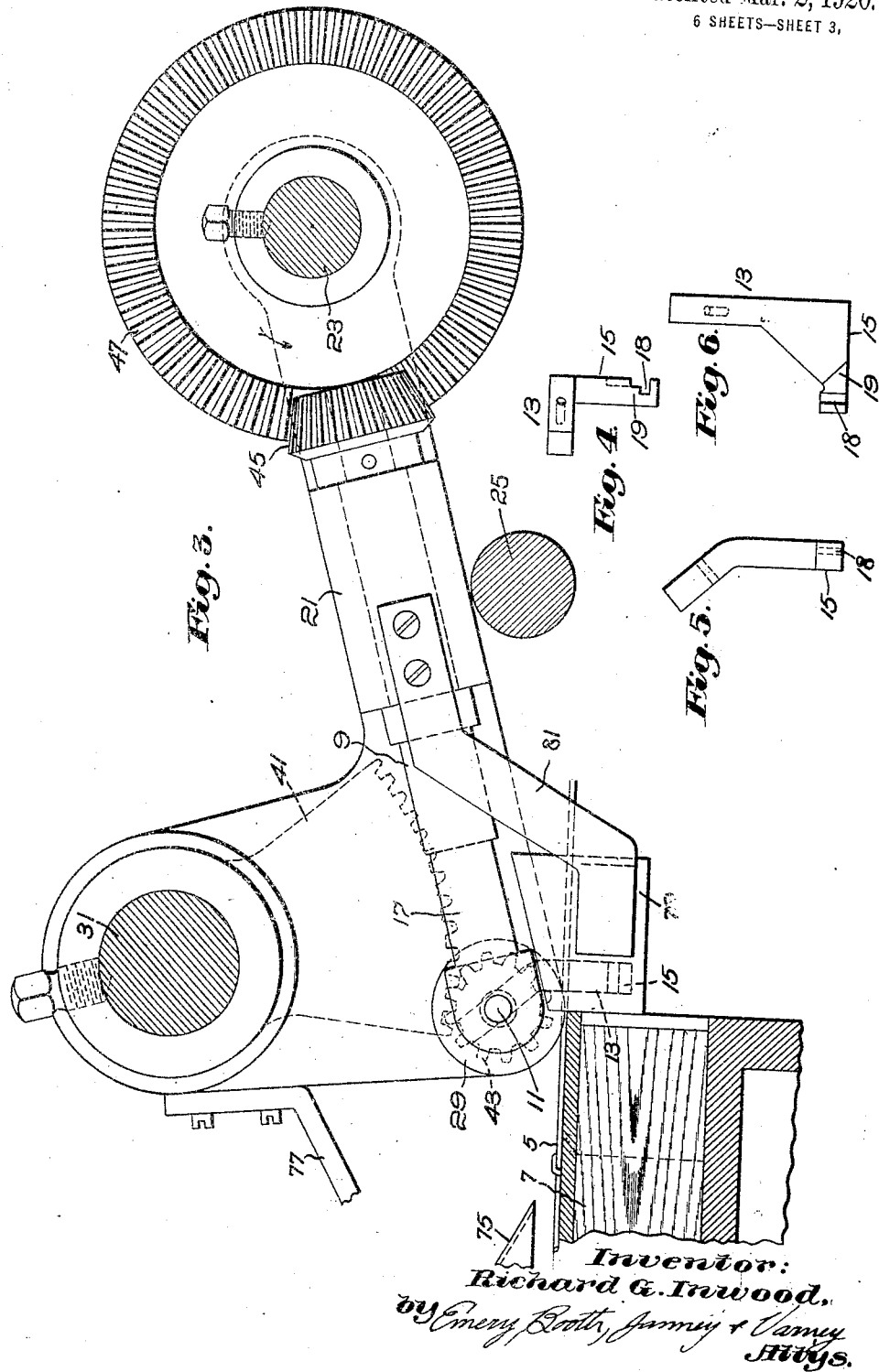

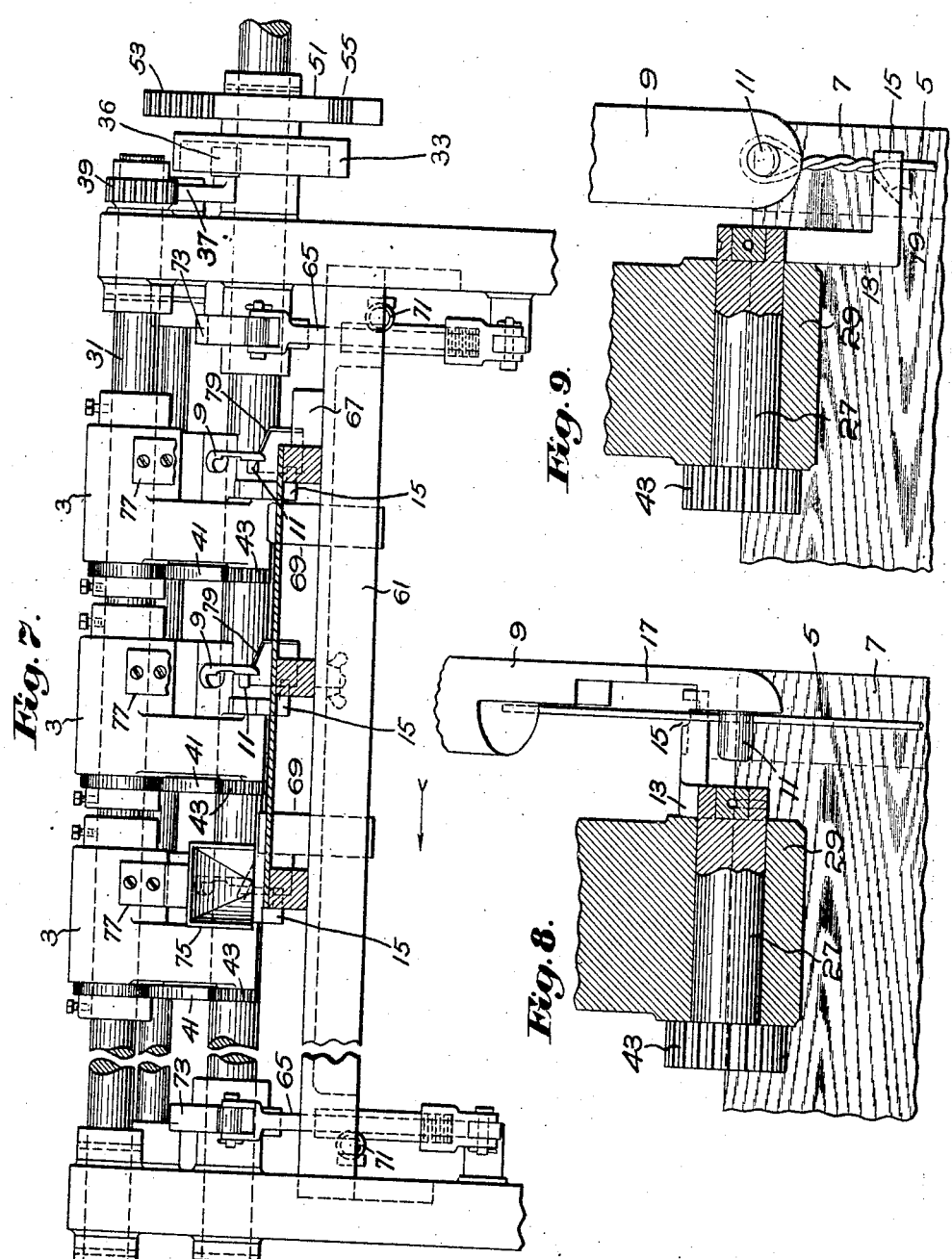

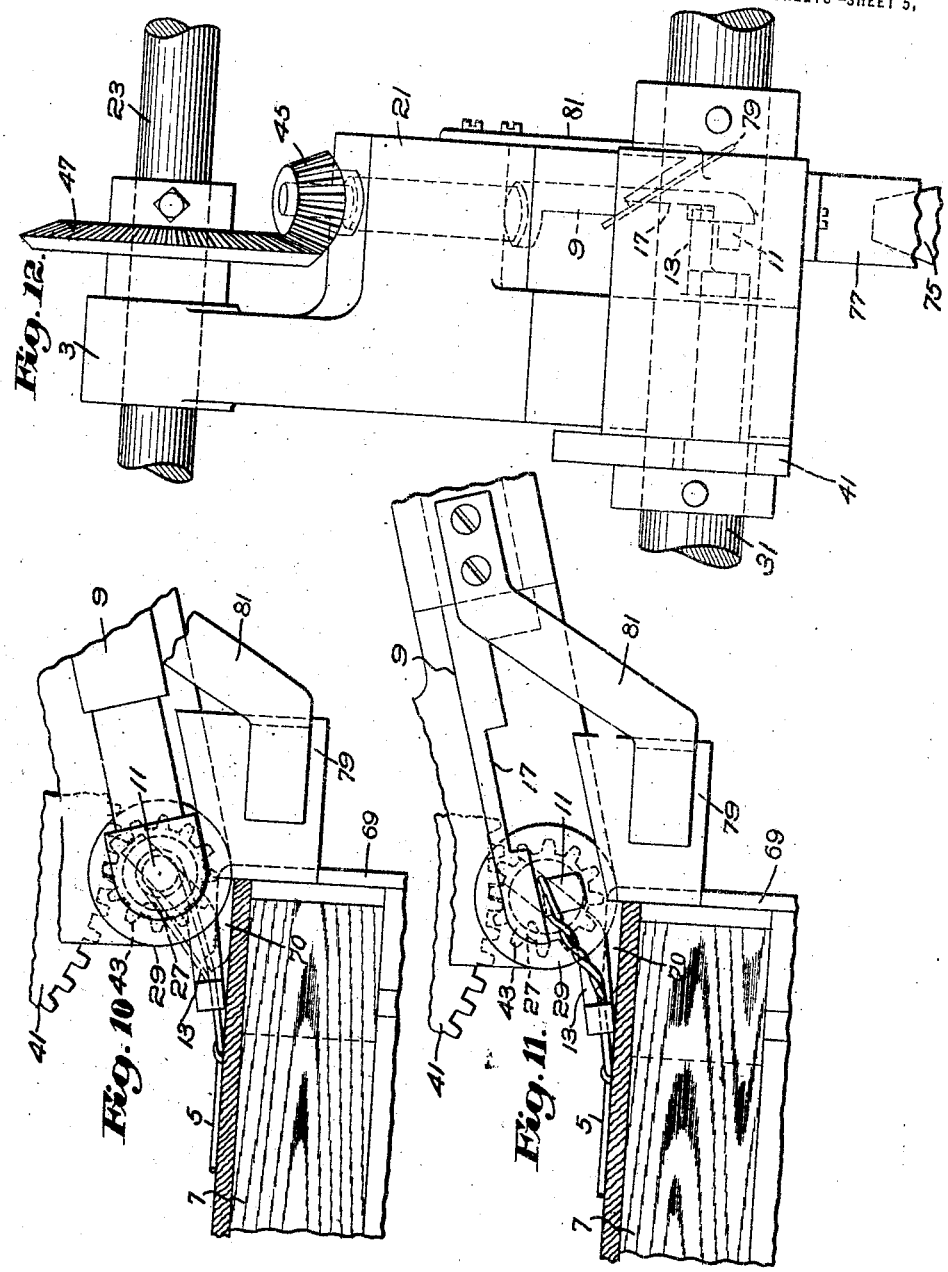

R. G. INWOOD, DEC'D.
M. C. INWOOD, ADMINISTRATRIX.
MACHINE FOR USE IN MAKING BOX PARTS OR BOXES.
APPLICATION FILED JUNE 25, 1917.
1,332,728.
Patented Mar. 2, 1920.
6 SHEETS—SHEET 6.
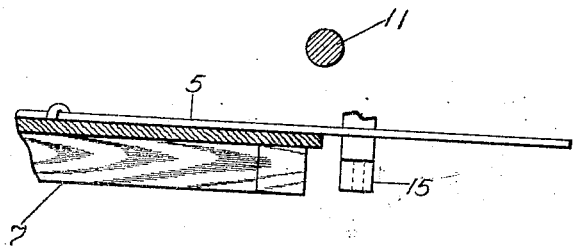
Fig. 13
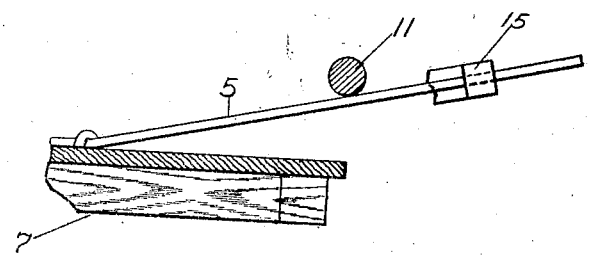
Fig. 14
Fig. 16
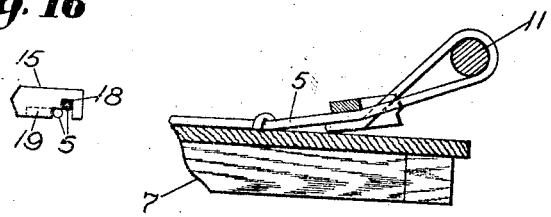
Fig. 15
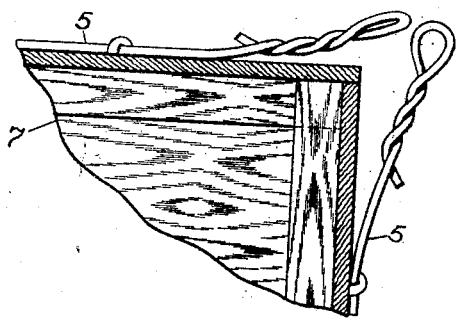
Fig. 17
Inventor:
Richard G. Inwood,
by Emery, Booth, Janney & Varney
Attys

UNITED STATES PATENT OFFICE.

RICHARD G. INWOOD, DECEASED, LATE OF SOUTH BEND, INDIANA, BY MARY CAIN INWOOD, ADMINISTRATRIX, OF SOUTH BEND, INDIANA, ASSIGNOR TO WIRE-BOUNDS PATENTS COMPANY, OF KITTERY, MAINE, A CORPORATION OF MAINE.

MACHINE FOR USE IN MAKING BOX PARTS OR BOXES.

1,332,728.

Specification of Letters Patent. Patented Mar. 2, 1920.

Application filed June 25, 1917. Serial No. 176,847.

*To all whom it may concern:*

Be it known that RICHARD G. INWOOD, deceased, late a citizen of the United States, and resident of South Bend, in the county of St. Joseph and State of Indiana, has invented an Improvement in Machines for Use in Making Box Parts or Boxes, of which the following is a specification.

This invention relates to machines for supplying fastening means to wires on wire-bound box parts, by which fastening means the box parts may be connected one with another.

Among other objects, the invention is intended to provide fastener-supplying mechanism and coöperating work-controlling mechanism by which fasteners may be supplied to the wires of wire-bound box parts in whatever relation to the box parts may be desired.

The character of the invention may be understood by reference to one form of machine embodying the invention adapted to supply one convenient form of fastener, both of which are shown for illustration in the accompanying drawings.

In the drawings, Figure 1 is a plan view of the illustrative machine, certain of the parts being broken away;

Fig. 2 is a side elevation of the machine viewed from the right in Fig. 1;

Fig. 3 is a section on line 3—3 of Fig. 1;

Figs. 4, 5 and 6 are detached details of a wire bending element of the machine;

Fig. 7 is an end elevation of the machine as viewed from the bottom of the sheet in Fig. 1 and from the left in Fig. 2;

Figs. 8 and 9 are detached plan views, partly in section, of wire bending and twisting elements of the machine;

Fig. 10 is a side elevation of the wire bending and twisting elements, viewed from the right in Figs. 8 and 9 and showing those elements at the end of a wire bending operation and preparatory to a wire twisting operation;

Fig. 11 is a side elevation similar to that of Fig. 10, showing the same parts at the end of a wire twisting operation;

Fig. 12 is a detail plan view of a wire bending and twisting unit on a larger scale than that of Fig. 1;

Fig. 13 is a diagrammatic side elevation of the wire bending elements in the positions which they occupy at the time the wired box part is first introduced into the machine;

Fig. 14 is a similar diagrammatic view showing the parts in the positions they occupy at an intermediate stage in the wire bending operation;

Fig. 15 is another similar view showing the parts at the end of a wire bending operation and just preceding the twisting operation;

Fig. 16 is a detached detail end elevation of one of the wire bending elements showing the relation thereto of the wire; and Fig. 17 is a diagrammatic view of a corner of a wire-bound box provided with the illustrative form of fastening means.

Figure 1:
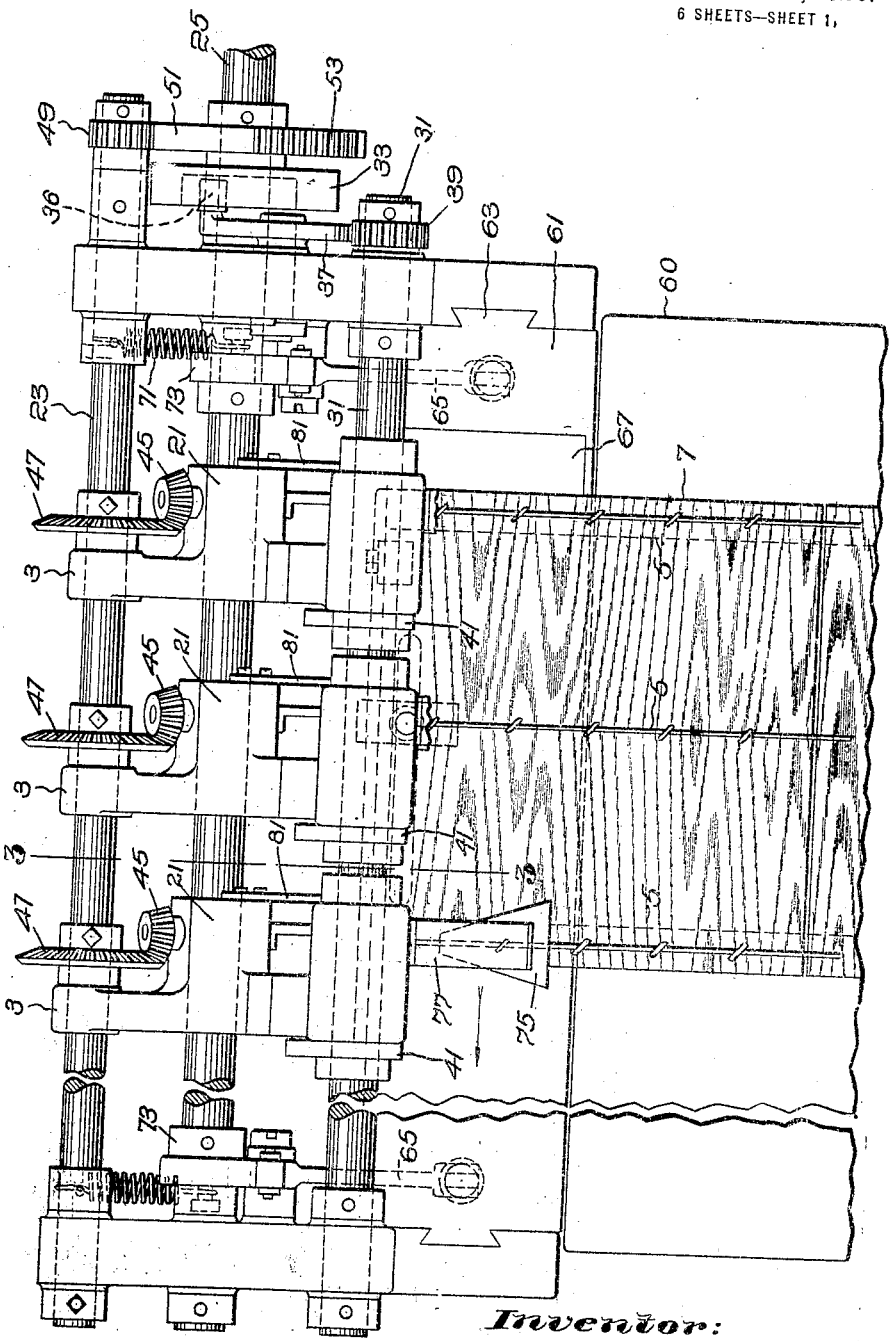

Referring to Fig. 1, the machine there illustrated comprises a number of fastener-supplying units 3, corresponding respectively to the wires of a wire-bound box part which are intended to be supplied with fastening means.

The fastener-supplying units are preferably placed in desired alinement and operated simultaneously to supply fasteners to the wires 5 previously secured to the box part 7, the latter being illustrated for example as one of the side sections of a wire-bound box-blank. The character of fastening means supplied by this specific mechanism is shown in Fig. 17. This fastener consists of a bight formed directly upon the wire binding itself by having the legs of the bight twisted together.

The illustrative form of fastener-supplying unit will be first described, such units being in this instance wire bending and twisting mechanisms.

Referring to Figs. 3, 8 and 9, each bending and twisting mechanism comprises a rotatable twisting member 9 having a lateral extension 11 which serves as a forming stud around which the wire is bent, as indicated in Figs. 13, 14 and 15, in the preliminary formation of the bight. During this preliminary bending of the wire, the forming stud 11 remains stationary but after the parts have reached the positions shown in Fig. 15, the forming stud 11 then projecting through the bight, the twisting member 9 and the stud 11 are rotated upon the longitudinal axis of the member 9 so as to twist together the legs of the bight as shown in Fig. 9.

The bending of the wire around the forming stud 11 is done by a rotating wiper 13 having a wiping arm 15. The initial relationships of the parts when the wired box part is first introduced to the machine are indicated in Fig. 8 and also in Fig. 13. There the wire 5 is shown as lying above the wiper 15 and below the forming stud 11. The twisting member 9 is recessed, as shown at 17 in Fig. 8, to permit the movement of the wiper 15 presently described. The details of the wiper are shown in Figs. 4, 5, 6 and 16. The wiper 15 has a deep recess 18 and a second recess 19 of less depth, the former being provided to receive the main body of the wire, as shown in Fig. 16, and the latter, to receive the free end of the wire, as shown in Figs. 9 and 16. The recess 19 has an oblique wall, as best shown in Fig. 6, against which the free end of the wire is turned during the twisting operation so as to lie beneath the main body of the wire and against the box part so as to minimize the likelihood of the free end catching in the clothing or hands of those using the box.

In the preliminary wire bending operation, the wiper 15 is moved, from the positions indicated in Figs. 3, 8 and 13, to the positions shown in Figs. 9 and 15, by being rotated in a contra-clockwise direction (viewing Fig. 3) about an axis which passes through the center of the forming stud 11 when in the position shown in Figs. 3, 8, and 13. This movement of the wiper 15 bends the wire around the forming stud 11, as indicated in Figs. 13, 14, and 15, and preferably, in the end, clamps the two legs of the wire bight against the adjacent box part so as to hold the legs securely in position during the twisting operation. Thereupon the twisting member 9 is rotated to produce the twist. It is preferred that this rotation of the twisting member 9 about its longitudinal axis take place in a contra-clockwise direction in Figs. 8 and 9 so that the extreme free end of the wire will be positioned beneath the body of the wire, and this results in positioning the body of the wire in the recess 18 of the wiper, as shown in Fig. 16, while the extreme end of the wire is moved into the position in the recess 19 indicated in Figs. 9 and 16. The wire may be given any suitable number of twists, and preferably the twisting operation terminates at a time when the forming stud 11 projects downwardly as shown in Fig. 11, this permitting the bight to be stripped off the stud 11 and the box part to be removed by withdrawing them downwardly. Also, this provides that the plane of the bight shall be substantially parallel with the face of the box part, which is desirable in some cases since it may facilitate the fastening together of adjacent fastening devices in the finished box.

The several movements of the parts described above, and which are desirable when the illustrated form of fastening means is to be supplied, may be produced in any practicable manner. For example, each twisting member 9, as shown in Figs. 3 and 12, is mounted in a bearing 21 which receives support from a countershaft 23 which is driven from the main shaft 25 (Fig. 2). The wiping arms 13, carrying the wipers 15, are mounted (Figs. 8 and 9) upon shafts 27, mounted in bearings 29 and driven from a counter-shaft 31 which coöperates with the shaft 23 to support the fastener-supplying units 3.

The mechanism for rotating each wiping arm 13 will be next described.

Referring to Figs. 2 and 7, a cam 33 is mounted on the main shaft 25 and has a cam groove 35 which is entered by a roller 36 on a sector 37 pivoted at 38 and meshing with a pinion 39 on the counter-shaft 31. The main shaft 25 rotates in the direction indicated by the arrow at the right of Fig. 2, and therefore the cam groove 35, beginning with the position shown in Fig. 2, rocks the sector 37 contra-clockwise, and rotates the shaft 31 and pinion 39 clockwise. A sector 41 mounted upon the shaft 31 is thereby rocked clockwise and drives a pinion 43 on the wiper shaft 27 contra-clockwise. This moves the wiper 15 from the position shown in Fig. 13 through that shown in Fig. 14 to that shown in Fig. 15. This movement is caused by the rise in the cam groove 35, after which a dwell of suitable length holds the parts in the position shown in Fig. 15 during the twisting operation, after which the parts are returned to the position shown in Fig. 2.

The right-hand end of the twisting member 9 in Fig. 2 has a miter pinion 45 (well shown in Fig. 3) which meshes with a miter gear 47 upon the counter-shaft 23 which carries a pinion 49. This pinion is driven intermittently by a mutilated gear 51 carried on the main shaft 25 (Fig. 2). This mutilated gear 51 has a set of teeth 53 which engage the twisting pinion 49 after the bending operation has been completed, as shown in Fig. 15, and rotate the pinion 49 through an appropriate number of revolutions to produce the desired number of twists in the wire and to leave the twisting member 9 in the position shown in Fig. 11 with the forming stud projecting downwardly. Following the set of teeth 53 on the gear 51 occurs a mutilation which permits the twisting pinion 49 and the train of twisting mechanism to remain stationary while the bight is being stripped from the forming stud 11 and the box part is being removed from the machine. Thereafter the set of teeth 56 further rotates the twisting pinion 49 and the remaining train to move the forming stud 11 from the position shown in Fig. 11 to that shown in Figs. 3, 8, and 13. Following the set of teeth 56 is a mutilation 59 which permits the twisting mechanism to remain stationary during the preliminary bending operation.

It is important that the wired box part and the wire carried thereby be positioned fairly definitely in relation to the twisting and bending or other fastener-supplying mechanism so that the fastener, when ultimately provided, shall be positioned in desired relationship to the box part, as for example in relation to the edge of a wire-bound box section. For this purpose, the illustrative machine is provided with work-controlling means, including a two-part table 60—61, the latter being movable vertically between its uppermost position, wherein it holds the box part properly with reference to the working parts of the machine, and its lowermost position, wherein it supports the box part for removal after the fastener bights have been stripped from the forming studs 11. The table 61 is mounted in vertical guides 63 and is reciprocated vertically at proper intervals by the bell crank lever 65 suitably connected to the table and operated by a cam on the main shaft 25, as presently more fully described. On the table 61 (as shown in Figs. 1, 2, and 7) is a positioning device or guide 67 to engage a side of the box part.

As shown in Fig. 2 the table 61 is provided with a positioning member or guide 69 which stands at the front edge of the box part to position the same with reference to the working parts of the machine. This guide 69 has a projection 70 (Fig. 2) which may overlie the top of the box part to hold it down and to assist in moving the box part downwardly with the table 61 in the withdrawing and stripping operation. The table 61 and its guides 67 and 69 are so positioned in relation to the forming stud 11 and the wiper 15 that the fastener will be formed in desired relationship to the box part 7.

The vertical movement of the table 61 actuated by the bell-crank lever 65 is produced by a cam 73 on the main shaft 25, the shape of this cam being such that the table 61 is held in its uppermost position during the bending and twisting operation and thereafter is withdrawn downwardly to strip the bight of wire from the forming stud 11. In order to guide the wires into their proper position in relation to the bending and twisting elements, as the box part is introduced into the machine, funnel-shaped guides 75 may be provided supported by bracket 77 from the frame of the machine in front of the twisting units. In Figs. 1 and 7 a guide 75 is shown only on the left-hand unit 3 but similar guides may be used in conjunction with the other units.

Additional guides 79 may be provided at the rear of the forming stud 11 in order to guide the wires horizontally into proper position underlying the forming stud 11 and overlying the wiper 15.

Obviously the present invention is not limited to any particular structural details or mode of operation or to any especial type of fastener to be supplied. On the contrary the mechanical details, the mode of operation and the character of fastener supplied may be variously modified. Furthermore it is not indispensable that all the features of the invention be used conjointly since they may be used to advantage in various different combinations and subcombinations.

What is claimed is:—

1. A machine for use in making boxes, functioning to provide a wired box part with fastening means for connection with another box part, and comprising, in combination, fastener-supplying mechanism constructed and arranged to receive a wire of a wired box part, means for operating said mechanism to provide said wire with such fastening means, and means determining the relation to said box part of the fastening means so provided.

2. A machine for use in making boxes, functioning to provide a wired box part with fastening means for connection with another box part,—which comprises, in combination, fastener-supplying mechanism; work-positioning means for relatively locating said mechanism and a box part having wire thereon; and means for operating said mechanism to provide said wire with such fastening means in a desired relation to said box part as determined by said work-positioning means.

3. A machine for use in making boxes, functioning to provide a wired box part with fastening means for connection with another box part,—which comprises, in combination, work-positioning means for a box part having wire thereon; fastener-supplying mechanism constructed to provide a piece of wire with a bight; said mechanism arranged to operate on the wire of said box part when positioned by said work-positioning means to provide such bight in a desired relation to such box part; and operating means for said mechanism.

4. A machine for use in making boxes, functioning to provide a wired box part with fastening means for connection with another box part,—which comprises, in combination, work-positioning means for a box part having wire thereon; fastener-supplying mechanism arranged for presentation of said wire thereto in the positioning of said box part; and means for operating said mechanism to provide said wire with such fastening means.

5. A machine for supplying wire on wirebound box parts with fastening means for connecting such parts one with another,—which comprises, in combination, fastener-supplying mechanism; means for operating said mechanism to supply wire on a box part presented thereto with such fastening means; a work-support; and means determining the relative positions of the work and said mechanism during a fastener-supplying operation; whereby said mechanism supplies said wire with such fastening means in desired relation to the box part.

6. A machine for supplying wire on wirebound box parts with fastening means for connecting such parts one with another,—which comprises, in combination, fastener-supplying mechanism comprising wire bending and twisting elements, said mechanism operative to bend wire on a box part presented thereto back upon itself and twist together the legs so formed; operating means for said mechanism; work-supporting means; and means determining the relative positions of the work and said mechanism during a fastener-supplying operation, whereby said mechanism supplies said wire with such fastening means in desired relation to the box part.

7. A machine for supplying wire on wirebound box parts with fastening means for connecting such parts one with another,—which comprises, in combination, fastener-supplying mechanism arranged to operate on wire of a box part presented thereto to provide said wire with such fastening means; a work-support; and means, comprising front and side gages for a box part determining the relative position of the work and said mechanism during a fastener-supplying operation; whereby said mechanism supplies said wire with such fastening means in desired relation to the box part.

8. A machine for use in making boxes comprising, in combination, mechanism to supply a wire secured to a box part with fastening means for connection with another box part; means for positioning said wired box part relatively to said fastener-supplying mechanism; and means for operating said fastener-supplying mechanism to provide said wire with such fastening means when said wired box part is in desired position.

9. A machine for use in making boxes, functioning to provide a wired box part with fastening means for connection with another box part,—which comprises, in combination, mechanism operative on wire on a box part to supply the same with such fastening means; and work-positioning means for relatively locating said mechanism and box part during such operation, whereby said mechanism may provide said wire with such fastening means in desired relation to the box part; one of said elements being movable in a direction for disengaging said fastening means from said mechanism.

10. A machine for use in making boxes comprising, in combination, fastener-supplying mechanism including wire bending and twisting elements, constructed to provide a piece of wire with fastening means; and work-positioning means for relatively locating said bending and twisting elements and a box part having wire secured thereto, whereby said mechanism may provide said wire with fastening means positioned in desired relation to the box part.

11. A machine for use in making boxes comprising, in combination, fastener-supplying mechanism comprising wire-manipulating elements to provide a piece of wire with a bight having the legs thereof twisted together; and work-positioning means for relatively locating said mechanism and a box part having wire thereon, whereby said mechanism may provide said wire with a bight in desired relation to the box part.

12. A machine for use in making boxes comprising, in combination, fastener-supplying mechanism comprising wire-manipulating means to bend a wire back upon itself and twist together the legs so formed, to provide a fastening means; and work-positioning means for relatively locating said mechanism and a box part having wire thereon, whereby said mechanism may provide said wire with fastening means positioned in desired relation to the box part.

13. A machine for use in making boxes comprising, in combination, a plurality of fastener-supplying mechanisms disposed in spaced relation along a line and corresponding respectively to wires upon a wired box part; means for temporarily maintaining a desired relationship between said line and the edge of a wired box part; and means for causing said mechanisms to operate upon said wires to provide fastening means thereon.

14. A machine for supplying wires on wire bound box parts with fastening means for connecting such parts one with another,—which comprises, in combination, a plurality of fastener-supplying units; work-positioning means; said units arranged for operation on a plurality of wires of a box part presented thereto to provide said wires with such fastening means; and means for concurrently operating said units.

15. A machine for use in making boxes, functioning to provide a wired box part with fastening means for connection with another box part,—which comprises, in combination, work-positioning means for a wired box part; a plurality of fastener-supplying units, said units arranged for operation upon the respective wires of such box part when positioned by said work-positioning means to provide the same with such fastening means in desired relation to the box part; and operating means for said units.

16. A machine for use in making boxes comprising, in combination, fastener-supplying mechanism constructed and arranged to receive a wire on a wired box part, means for operating said mechanism to provide said wire with fastening means, work-positioning means for relatively locating said mechanism and wired box part, and means determining the presentation of the wire to said mechanism in the positioning of the box part.

17. A machine of the class described comprising, in combination, a front edge gage for a wired box part; mechanism positioned relative to said gage to operate on a wire on said box part to supply the same with fastening means for connection with another box part; said mechanism adapted to engage the wire in a predetermined relation to said box part; and operating means for said mechanism.

18. A machine of the class described comprising, in combination, a front edge gage for a wired box part; mechanism positioned relative thereto to operate on a wire on said box part to supply the same with fastening means for connection with another box part; and operating means therefor; said mechanism adapted to exert a pull on the wire opposed by abutment of said box part against said gage.

19. A machine of the class described comprising, in combination, positioning means for a wired box part, means for clamping on said box part a looped portion of a wire thereon, and means for twisting said looped portion.

20. A machine of the class described comprising, in combination, positioning means for a wired box part, means for bending a portion of wire thereon, including an element around which the wire is bent in definite relation to said box part, means for guiding the wire in presentation to said element, means for twisting the bent portion to provide a fastening means, and operating mechanism for successively operating said bending and twisting means.

21. A machine of the class described comprising, in combination, positioning means for a wired box part, and wire-manipulating mechanism arranged for insertion therein of a wire on said box part, said mechanism including a rotary twister arranged to receive said wire alongside thereof and having a lateral forming stud, a wiper to bend the wire about said stud, and operating means for said mechanism.

22. A machine of the class described comprising, in combination, positioning means for a wired box part, and wire-manipulating mechanism arranged to operate on a wire on said box part, including a rotary twisting element and coöperating means to bend said wire about said element and clamp the portion so bent upon said box part, and operating means for said mechanism.

23. A machine of the class described comprising, in combination, means for positioning the edge of a wired box part, means to bend back and hold in fixed relation to said box part the end portion of a wire thereon, and means for twisting said portion.

24. A machine for twisting a loop in the end of a wire attached to box material comprising, in combination, a twisting member, means for bending the end of the wire around the twisting member and placing and holding the same adjacent the main wire and means for revolving the twisting member in a direction toward the end of the wire for the purpose of drawing the wire end under the main wire and leaving it after the twisting between the binding member and the box material.

25. A machine for forming a loop in the end of a wire attached to box material comprising a rotatable twisting member for engaging the wire at a point spaced from the end and clamp for holding the wire end in contact with the box material and by the side of the main wire for operation of the twisting member thereon, said clamp having provision allowing the main wire to lift from the box material approximately the thickness of the wire to allow the end to be drawn under the main wire in the plane of the box material.

26. A machine of the class described comprising, in combination, fastener-supplying mechanism; work-positioning means, said mechanism comprising means to bend wire on a box part presented thereto upward relative to the plane of the box part, to double the wire and twist the doubled portion; and operating means for said mechanism.

In testimony whereof I have signed my name to this specification.

MARY CAIN INWOOD,

*Administratrix of Richard G. Inwood, deceased.*